United States Patent
Neuhaus et al.

(10) Patent No.: US 7,688,763 B2
(45) Date of Patent: Mar. 30, 2010

(54) METHOD FOR ESTABLISHING A COMMUNICATION CONNECTION IN A DIRECT COMMUNICATION NETWORK

(75) Inventors: Ralf Neuhaus, Lünen (DE); Rainer Uecker, Mülheim (DE)

(73) Assignee: Siemens Enterprise Communication GmbH & Co. KG, Munich (DE)

( * ) Notice: Subject to any disclaimer, the term of this patent is extended or adjusted under 35 U.S.C. 154(b) by 1035 days.

(21) Appl. No.: 10/572,034

(22) PCT Filed: Sep. 17, 2004

(86) PCT No.: PCT/EP2004/010474

§ 371 (c)(1),
(2), (4) Date: Mar. 15, 2006

(87) PCT Pub. No.: WO2005/032102

PCT Pub. Date: Apr. 7, 2005

(65) Prior Publication Data

US 2007/0071226 A1 Mar. 29, 2007

(30) Foreign Application Priority Data

Sep. 26, 2003 (DE) .............................. 103 45 072

(51) Int. Cl.
*H04L 12/66* (2006.01)
(52) U.S. Cl. .................. 370/259; 381/352; 381/356
(58) Field of Classification Search ......... 370/352–356, 370/401, 410, 475, 259
See application file for complete search history.

(56) References Cited

U.S. PATENT DOCUMENTS 7,130,282 B2 * 10/2006 Black ....................... 370/352

2001/0005382 A1 * 6/2001 Cave et al. ................ 370/352
2003/0095546 A1   5/2003 Sakano et al.
2004/0071130 A1 * 4/2004 Doerr et al. .............. 370/352

FOREIGN PATENT DOCUMENTS

WO   WO 2004/066605 A1   8/2004

OTHER PUBLICATIONS

International Telecommunication Union,."ITU-T, Recommendation H.323", Series H: Audiovisual and Multimedia Systems, Packet-based multimedia communications systems, Jul. 2003, pp. i-viii, 1-240.

(Continued)

*Primary Examiner*—Suhan Ni
(74) *Attorney, Agent, or Firm*—Buchanan Ingersoll & Rooney PC (57) ABSTRACT

In order to establish a communication connection between two subscribers in a direct communication network, signaling information containing subscriber address information is exchanged between subscribers participating in the communication connection. The communication connection is directly established between the subscribers participating in the communication connection on the basis of the subscriber address information. According to the invention, the following steps are carried out: first, subscriber address information of at least one target subscriber required for establishing a paired communication connection between the subscribers is stored in a first subscriber; the stored subscriber address information of the target subscriber is then transmitted to a calling subscriber by the first subscriber; and the calling subscriber uses said subscriber address information in order to establish the communication connection between the calling subscriber and the target subscriber.

20 Claims, 8 Drawing Sheets

OTHER PUBLICATIONS

Markku Korpi and Vineet Kumar, "Supplementary Services in the H.323 IP Telephony Network", IEEE Communications Magazine, Jul. 1999, pp. 118-125, Retrieved from Internet: URL http://www.comsoc.org/-ci/private/1999/jul/pdf/Korpi.pdf>, Retrieved on May 4, 2004.

International Telecommunication Union, "ITU-T, Recommendation H.450.3", Series H: Audiovisual and Multimedia Systems, Call Diversion Supplementary Service for H.323, Feb. 1998, pp. i-vi, 1-60.

* cited by examiner

METHOD FOR ESTABLISHING A COMMUNICATION CONNECTION IN A DIRECT COMMUNICATION NETWORK

CROSS REFERENCE TO RELATED APPLICATIONS

This application is the US National Stage of International Application No. PCT/EP2004/010474, filed Sep. 17, 2004 and claims the benefit thereof. The International Application claims the benefits of Germany Patent application No. 10345072.6 filed Sep. 26, 2003, all of the applications are incorporated by reference herein in their entirety.

FIELD OF THE INVENTION

The invention relates to a method for setting up a communication link between two clients of a plurality of clients in a directly-communicating communication network as claimed in the precharacterizing clause of patent claims.

BACKGROUND OF THE INVENTION

Communication networks whose components communicate with one another by packet switching are being used increasingly instead of line-switching communication networks. Networks such as these are frequently also referred to as Voice-Over-IP (VoIP) networks, when the Internet Protocol (IP) is used to interchange acoustic information (speech data) in the form of data. In this case, the networks may either be used exclusively for transmission of speech data or else can transmit both speech data and other information (for example data, video) as well in a mixed form.

In line-switching communication networks, terminals (for example telephones, fax machines) are always connected to a communication node (for example to a telephone system). The entire information flow to and from the terminals in this case takes place with the involvement of the respective communication node, with control information, for example for setting up links, being interchanged between the terminal and the communication node, while the payload information (the analog speech signal of the modulated fax signal) is admittedly interchanged between the terminals that are involved in the communication link but is passed on (transmitted) by at least one communication node that is involved in the communication link.

In speech data networks, the terminals are frequently referred to as "clients", because the terminals in these communication networks are operated in a similar manner to a computer in a data network and not only as a telephone or fax machine, but may also, for example be in the form of a multimedia PC. A multimedia PC is a computer which has suitable hardware for inputting information (for example a microphone, camera, keyboard, scanner etc.) and for outputting information (for example, a screen/display, loudspeakers, LEDs etc.). Clients may also be in the form of a miniature PC (so-called PDA—Personal Digital Assistant) or an extended mobile telephone (smart phone). The appliances mentioned are often equipped with a cordless data link and, in the case of mobile telephones are then also referred to as "WLAN cellphones" (WLAN=Wireless Local Area Network).

The clients in speech data networks generally interchange the payload information directly with one another. For this purpose, once a communication link has been set up, two clients communicating with one another each interchange the data packets with the payload information with the knowledge of the network address of their communication partner, and on the basis of these network addresses. In order to set up a link, by contrast, central network nodes (communication nodes) are also used in the known speech data networks. Network nodes such as these are known to the speech data networks which use H.323 protocol (ITU-T-H.323) as "gatekeeper" and to the speech data networks which use the SIP protocol (IETF-SIP; SIP=Session Initiation Protocol), as SIP proxy servers.

Widespread data networks, in particular, the Internet, are increasingly using communication structures which are referred to as "peer-to-peer" networks or else "end-to-end" networks. One primary field of application for communication structures such as these is to interchange files, so-called "file sharing". In this case, a subscriber (client) to a communication structure such as this checks a number of other clients (typically computers) when looking for a specific resource (which may be a music file or a computer program), and starts to use this resource once it has been found, which generally involves the transmission ("download") of one or more files. In this case, either appropriate communication partners (clients) are found using a database, or else the clients can be found by appropriate communication methods without any central instance.

Some of the known "peer-to-peer" networks are used for the purpose of direct communication. The "media data" that is interchanged in this case, that is to say the payload data, is not restricted to speech (speech data) or modulated information (for example fax transmissions), but also includes moving image information (video transmission, video conferences, "multimedia messaging") and other forms of electronic communication. In communication networks such as these, which are also referred to as "directly-communicating communication networks", this means on the one hand that communication links can be set up in the form of conventional "telephone calls", while on the other hand it is also possible to transmit extended contents ("multimedia"). Avoiding the use of central network nodes (communication nodes) in this case results in the advantage of increased resistance to failures, although it is associated with the disadvantage that the (switching) functionality of the network nodes, as is known from line-switching telephony must be provided by the clients involved in the communication link, themselves.

In the case of the known directly-communicating communication networks, it has been found to be particularly disadvantageous when a client must have the address information (for example the network address) of a second client in order to set up a communication link to that second client. This is a problem because, in general, there is no network node (for example communication server) directly associated with the client, with which it is possible to check an address such as this. Even if the address information for the desired communication partner is known, it is possible in directly-communicating communication networks that it is not possible to reach this desired communication partner (for example if it is "busy" or if the client has failed) so that, for example it is desirable to set up a link to an alternative call destination ("alternative destination"). Since directly-communicating communication networks do not use central network nodes for storage of address information such as this, the problem of addressing still exists when setting up a connection to an alternative call destination such as this.

SUMMARY OF THE INVENTION

One object of the invention is to propose a method by which the address information which is required for communication links in directly-communicating communication networks can be determined.

The object is achieved on the basis of the precharacterizing clause of patent claims, in that the following method steps are carried out successively: first of all (step a) client address information which is required to set up a communication link between the clients in pairs is stored for at least one destination client in a first client. Then (step b), the stored client address information for the destination client is transmitted from the first client to a calling client, and then (step c) the calling client uses this client address information to set up the communication link between the calling client and the destination client.

When the abovementioned method steps are carried out, this results in a calling client in the directly-communicating communication network having transmitted to it the address of the destination client that is required to set up a communication link, with the link being set up without any access to a central communication node or to a central address database.

The method is refined by the characterizing features of the dependent patent claims. In this case, features of the dependent patent claims can also advantageously be combined with one another.

The method allows features to be provided in a directly-communicating communication network without the inclusion of a central switching instance, in which case, as a further advantage, the lack of a central communication node or of a central subscriber directory results in a high degree of operational reliability and availability in the communication network because, in the event of a failure of one communication component (client) only a relatively small portion of the communication network is affected. Furthermore, communication networks which use the method according to the invention can be extended more easily and can be scaled better.

Call forwarding can be set up and carried out in a simple manner and in that in order to forward a call, the destination client forms the call forward destination for the first client in step a), and the calling client sends signaling information for call signaling to the first client between steps a) and b), in order to set up a communication link.

The feature of "call forwarding" can advantageously be made use of in the event of an unsuccessful call to a free subscriber (client) in that the details about waiting time are stored in the first client in step a), and a call is signaled to the first client in step b), on the basis of the received signaling information, and the stored client address information is transmitted to the calling client only if the call to the first client is not answered within the waiting time.

The fact that call forwarding has been carried out can remain concealed for the calling client if the destination client forms the call forward destination for the first client in step a), and when a call arrives from the calling client, the first client sends signaling information for call signaling of a further call to the destination client in step b), in which case on acceptance of the further call at the destination client, the latter transmits a call acceptance signaling message to the first client, on the basis of which the first client transmits the client address information for the destination client to the calling client. In this case the call forwarding is carried out not only when the first client is busy but also in the case of a call which is not accepted by the first client, in that the signaling information for call signaling of the further call is transmitted to the destination client if the call is not answered at the first client within a waiting time. This waiting time can advantageously be set or changed by a user at the first client, by an input.

In the case of call-forwarding, a user at the first client can enter various call-forwarding destinations, with a suitable one of the call forwarding destinations being selected depending on the nature (service) of the call arriving at the first client or of the communication link that is intended with the call. This is achieved in that the client address information for a plurality of destination clients is stored in the first client in step a), and is in each case associated with one or more different services, and when a call arrives at the first client, the signaling information in step b) defines the service which is intended to be supported by the communication link to be set up, with the client address information for that destination client which is associated with this service being selected and transmitted on the basis of this definition. In this case, the services are advantageously selected from a group which comprises at least speech services, video services and data services.

The method according to the invention allows a call to be signaled to a plurality of clients at the same time and to be answered at any desired one of these clients in that the destination client is provided as the follow-me destination in step a), the calling client sends signaling information for call signaling to the first client between steps a) and b) in order to set up a communication link, and the call signaling takes place both at the first client and at the destination client in step c) in that the calling client sends further signaling information for call signaling to the destination client with the communication link being set up between the calling client and the destination client when the call is accepted at the destination client.

In the case of follow-me, it is possible to avoid a situation in which the calling client sends signaling information to a plurality of clients, in that, in this case as well, the destination client is provided as the follow-me destination in step a), between steps a) and b), the calling client sends signaling information for call signaling to the first client in order to set up a communication link, and the call signaling takes place both at first client and at the destination client, in that the first client sends further signaling information for call signaling of a further call to the destination client, with the destination client sending a call acceptance message to the first client after acceptance of this call, and the first client also transmitting the call reception message with the client address information of the destination client to the calling client in step b).

The method allows the feature of "callback" to be provided in a simple manner in a directly-communicating communication network, in that in order to prepare for a callback, in situations in which an incoming call from the destination client to the first client is not accepted in step a), the destination client stores the client address information together with the callback information in the first client, and in order to carry out the callback in step b) the first client, as the calling client, requests the destination client to carry out the callback. In this case, the callback when the client is busy is requested in that step a) is carried out when the first client is in the busy state and, the callback is made when the busy state of the first client no longer exists. In contrast to this, a callback can also be requested in the case of a client which is not busy and to which a call has been signaled unsuccessfully in that step a) is carried out when the incoming call has not been accepted at the first client within a waiting time, and the callback is completed when an event which reflects the presence of a user is detected at the first client. An event such as this advantageously does not need to be an explicit reaction by a user to a callback request, so that the callback is initialized with as short a time delay as possible, for example when a person returns to his desk.

Various non-central message stores (speech boxes, video stores, e-mail system, etc.) can be used in directly-communicating communication networks in that in order to record and to call a message which is intended for the first client, before step a), a second client sets up a communication link to the destination client with the message being stored in the destination client, after step a) the presence of the stored message is signaled to the first client, in step b) in turn, the calling client is formed by the first client, and in step c) the stored message is called up at the destination client using the communication link. In this case, various services can be used in the communication network, in which case a plurality of recording clients for storage of messages are available in the communication network, and, before step a) the second client selects a suitable one of the recording clients as the destination client. In this case, in each case at least one type of recordable message is advantageously associated with the recording client in which case, in step a) in each case one recording client is selected which is appropriate for the type of message to be recorded.

In the event of a brief interruption in an existing communication link, for example for questions, it is advantageous for a subscriber (client) who is waiting during the interruption to be supplied with information (for example waiting music, product information, etc.). This can be achieved in that a first communication link exists between the first client and the second client in step a), with the client address information for the destination client being transmitted by the second client to the first client, the first client forms the calling client in step b), and the first communication link is cleared after step b), and after step c), the communication link which was set up in step c) between the calling client and the destination client is cleared, and the first communication link is set up again. In this case, the destination client is advantageously used as the information source for waiting times.

Before the interruption of the first communication link, a user of the second client can decide which contents and which type of media (speech, images, text information, etc.) should be output to the first client during the waiting time. This is achieved in that a plurality of clients can be used as the destination client in the communication network, with one of the usable clients being selected as the destination client by the second client in step a). In this case, the destination client can advantageously be in the form of an instance on the same hardware, which forms the basis for the first or for the second client.

In a directly-communicating communication network, announcements can be emitted to clients in a simple manner, in which case a client who is receiving the announcement can be activated automatically without a user having to do anything in that in step c) the calling client, when setting up the communication link, transmits call signaling information along with a control command to the destination client so that the call is automatically accepted by the destination client.

BRIEF DESCRIPTION OF THE DRAWINGS

Exemplary embodiments of the method according to the invention will be explained in the following text with reference to the drawings, in which.

DETAILED DESCRIPTION OF THE INVENTION

Figure 1A:
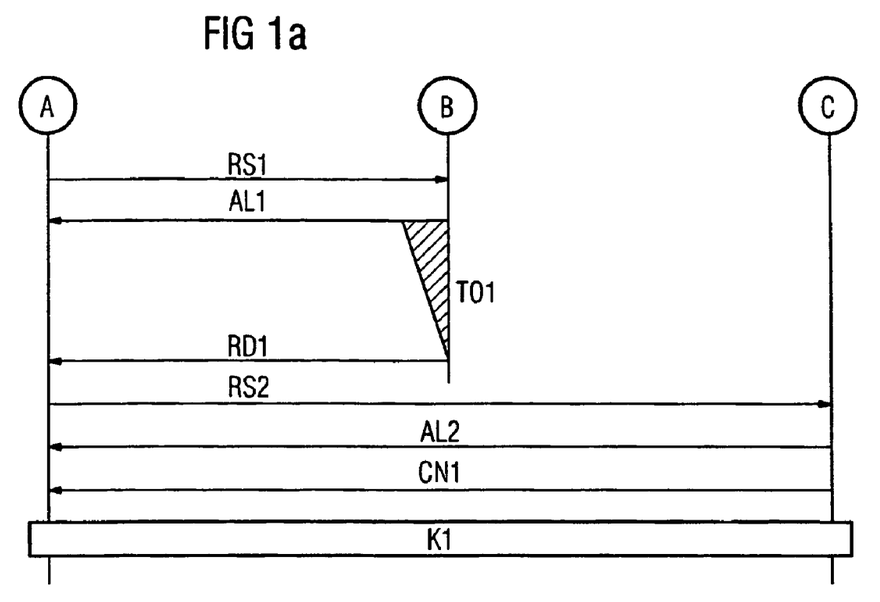
FIGS. 1a, 1b show the interchange of signaling information between clients in a directly communicating communication network, for the purpose of call forwarding when free.

FIG. 1a shows a schematic illustration of clients A, B, C who are arranged in a directly-communicating communication network (not illustrated). The clients A, B, C in this and in the following exemplary embodiments are in the form of multimedia PCs which set up communication links with one another in a packet-switching communication network (IP network; IP=Internet Protocol) by interchanging signaling information (control messages) with one another. These control messages are represented as arrows in the figures with the direction of the arrow in each case indicating the direction of the information flow of the respective control message. In this case, a multiple data interchange can take place between the clients interchanging the control message in order to interchange said control message, for example in order to acknowledge reception of the control message in a so-called "handshake process". In the case of the communication links between the clients as illustrated schematically in the figures, there is in each case a logic relationship between two clients, with data packets with payload information being transmitted between the clients on the basis of previously interchanged client address information. The payload information may optionally be speech information (speech data) or other contents (for example, video information, text information), and mixed forms of the various types of information (these are also referred to as "services") are possible.

Figure 6:
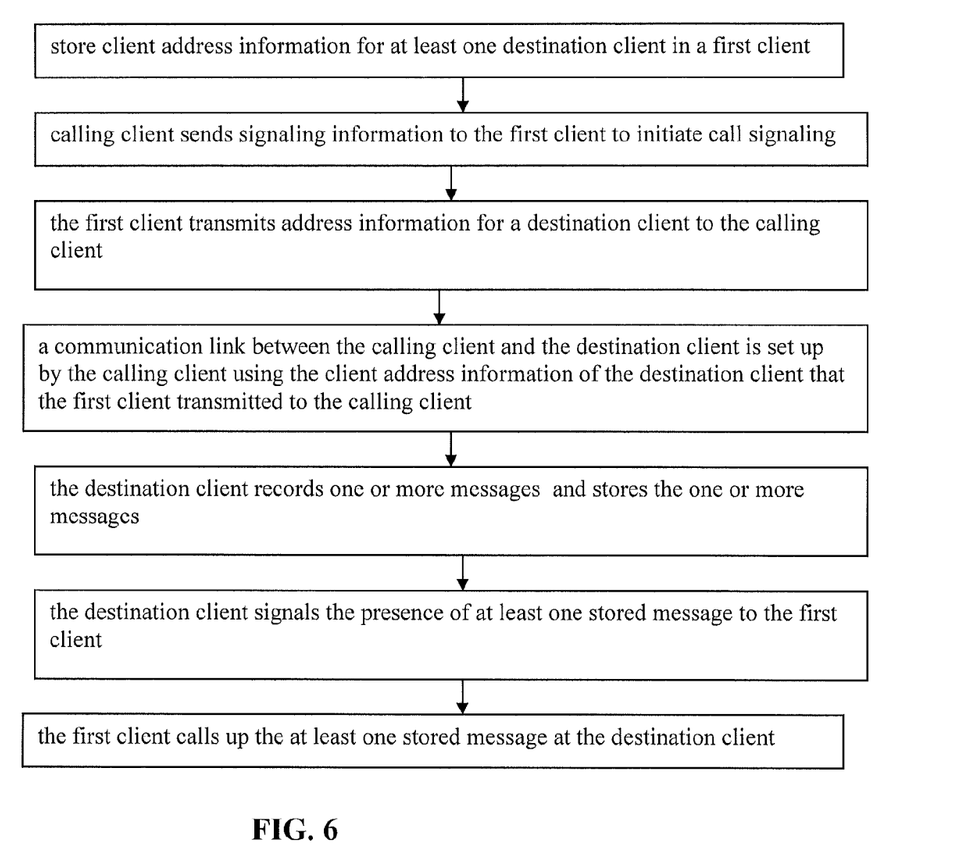
FIG. 6 shows a present preferred method for establishing a communication connection.

The clients, control messages and communication links which are known from FIG. 1a and from the following figures are also used repeatedly in other figures with the same reference symbols. These are then clients, control messages and communication links with essentially the same functions, and are therefore not described again in the description of the further figures. As may also be appreciated from the flow chart shown in FIG. 6, the clients may also be configured to perform the steps of a present preferred method of establishing a communication connection between a calling client and a destination client.

Instead of the multimedia PCs that were used as clients in the figures, it is also possible to use any other desired components intended for communication, for example telephony terminals (IP telephones, VoIP telephones; VoIP=Voice-over Internet Protocol), fax machines, etc. The significant factor for the clients described here is that they are designed for operation in directly-communicating communication networks, that is to say their function and interaction with other clients and devices in a communication network take place without the use of a central instance, for example a communication node or a central server. This principle is still applicable when the functionality of a client is not sufficient to carry out a specific task, and this client therefore appoints a proxy to carry out the functionality that it is missing.

Figure 1B:
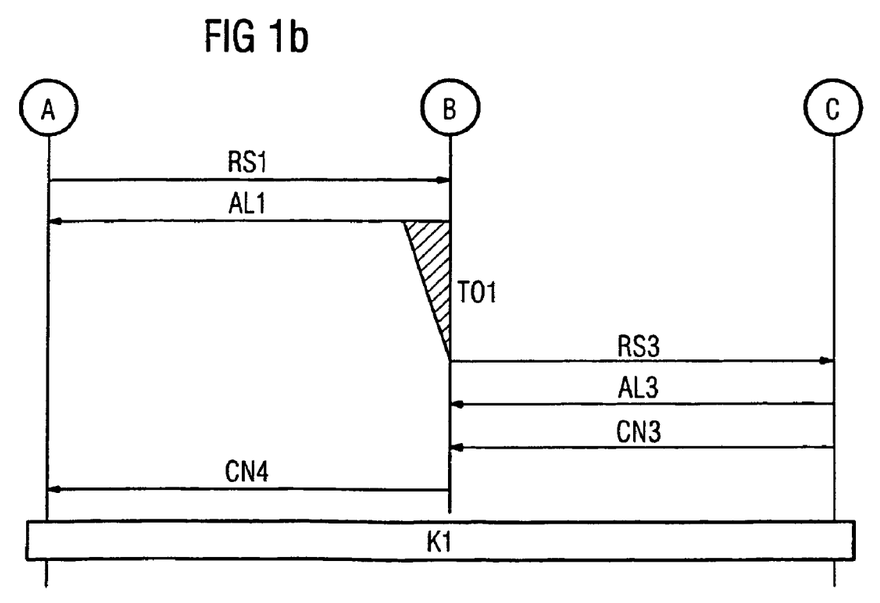
Figure 1C:
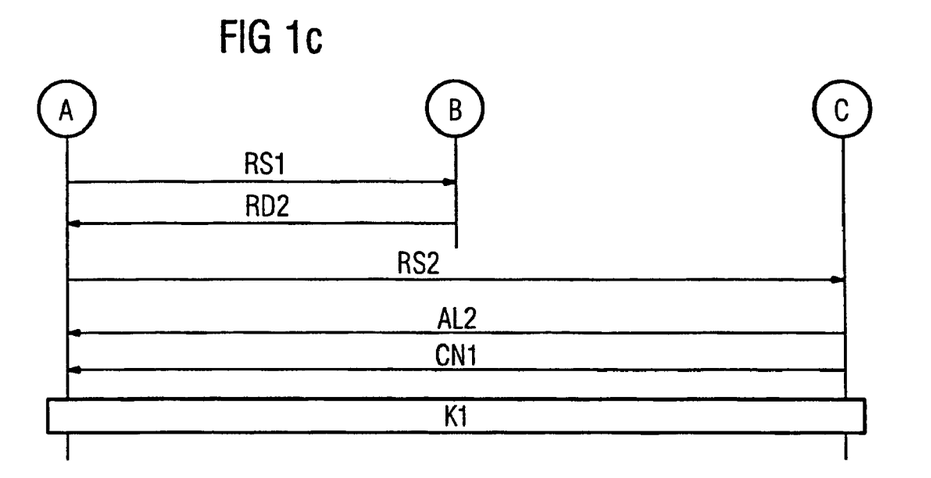
FIGS. 1c, 1d show the interchange of signaling information for call forwarding when busy.
Figure 1D:
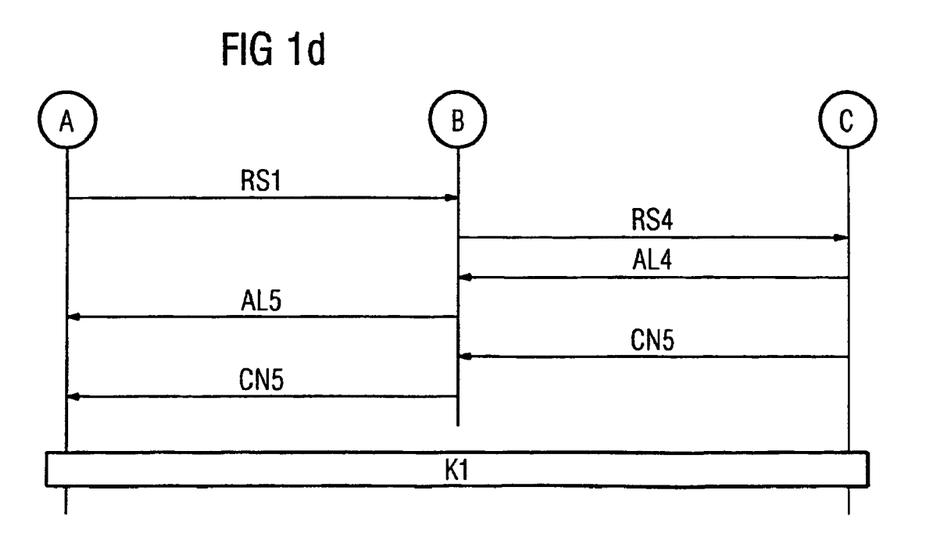

The implementation of the feature "call forwarding" with the aid of the method according to the invention will be described in the following text with reference to FIGS. 1a, 1b, 1c and 1d, with FIGS. 1a and 1b showing call forwarding in the case of a call to a free subscribe and FIGS. 1c and 1d showing call forwarding in the case of a call to a busy subscriber.

In FIG. 1a, a user of the client B as the first client has determined with an input that all calls which reach his terminal (client B) will be forwarded to the client C as the destination client after a waiting time TO1 (TO=Time Out) of 20 seconds if the call is not accepted at the client B within this waiting time TO1. Let us assume that a communication link is intended to be set up to a client B from the client A as the calling client. For this purpose, the client A sends a call signaling message RS1 to the client B, which initiates call signaling (the client B "rings") at the client B. At the same time the client B sends an acknowledgment message AL1 ("alerting") to client A as acknowledgment. The call is not accepted at the client B, so that the waiting time TO1 times out.

The client B now sends a call redirect message RD1 (RD=Redirect) to the client A, which instructs the client A now to signal the call which was signaled to the client B to the client C as the destination client. The call redirect message RD1 in this case comprises the client address information for the client C, which has been entered by the user during his definition of the client C as the call forwarding destination. The signaling of the call to the client B is now stopped, and the client A, as the calling client, sends further call signaling information RS2 to the client C, after whose reception the client C starts to signal the call, and in response to which the client C sends an acknowledgment message AL2 ("alerting") to the client A for acknowledgment. Once the call has been accepted at the client C, the client C sends a call acceptance signaling message CN1 ("connect"), to the client A in response to which the communication link K1 (payload data link) is established between the client A and the client C.

As a further example of call forwarding when free, FIG. 1b once again shows the waiting time TO1 being carried out in the client B as the first client by a user, and the client address information for the client C being defined as the call forwarding destination (destination client) for calls to the client B which are not accepted. In this case as well, a call from the client A to the client B takes place with the aid of the call signaling message RS1, with this call once again being acknowledged by the acknowledgment message AL1, and with the waiting time TO1 also passing in this case without the call having been accepted at the client B. In contrast to the process described with reference to FIG. 1a, the client B now ceases to signal the call and now uses a further call signaling message RS3 to the client C which, in addition to the command to signal a call to the client C, also includes the additional information that this call is a forwarded call from the client A. The call is now signaled to the client C, and an acknowledgment message AL3 is sent to the client B. Whilst the client C has accepted the call, the client C sends a call acceptance message CN3 to the client B in response to which the client B sends a further call acceptance message CN4 to the client A as the calling client, including the information that the call being signaled on the basis of the call signaling message RS1 has been forwarded to the client C, where it has been accepted. This call acceptance message CN4 also includes the client address information for the destination client, client C, so that the communication link K1 is now set up between the client A and the client C.

FIG. 1c shows call forwarding when busy, in a first variant. At the client B as the first client, a user defines the client C as the destination client for call forwarding when busy. In this case, the client address information for the destination client C is also stored in the client B. The client A now sends call signaling messages RS1 to the client B which, however, is already busy with a further communication link, which is not illustrated here. On the basis of the stored information, the client B now sends a call redirect message RD2 (for call forwarding) to the client A, including the designation and the client address information for the client C as the destination client, and also including the information that the client B is busy and that this call will thus be forwarded to the client C. As the calling client, the client A now sends further call signaling information RS2 to the client C, by which means the call is signaled to the client C, and the acknowledgment message AL2 is sent to the client A. After acceptance of the call at the client C, the client C sends out call acceptance message CN1 to the client A, after whose reception the communication link K1 is set up between the client A and the client C.

FIG. 1d also shows the signaling messages which are interchanged between the clients A, B, C in order to carry out call forwarding when busy. In this variant as well, the name and the client address information for the client C as the destination client for call forwarding when busy are stored in the client B as the first client. Client A now once again sends call signaling messages RS1 to the client B, with the client B also being busy in this case and not itself signaling the call. The client B now sends further call signaling messages RS4 to the client C, from which call signaling message it is evident that the call is the call which originated from the client A. In this case, the client address information for the client A, which is transmitted with the call signaling message RS1 to the client B, is also passed to the client C. The call is now signaled to the client C with this fact being signaled by the acknowledgment message AL4 from the client C to the client B. After reception of the acknowledgment message AL4, the client B sends an acknowledgment message AL5 to the client A, from which it is evident that the call that was initiated by the call signaling message RS1 has been forwarded to the client C and is now being signaled to the client C. After acceptance of the call at the client C, the client C sends a call acceptance message CN5 to the client B, in response to which the client B sends the call acceptance message CN6 to the client A, from which it is evident that the call has been accepted at the client C. The call acceptance messages CN5 and CN6 each also include the client address information for the client C. The information that the call has been accepted at the client C is now available in the client A, and the client address information for the client C is also available at the same time in the client A (as the calling client). On the other hand, the client address information for the client A is also available in the client C, so that the communication link K1 can be set up directly as the payload data link between the clients A and C.

In the exemplary embodiments described with reference to FIGS. 1a, 1b, 1c and 1d, a plurality of call forwarding destinations can in each case be stored in the client B as the first client. In this case, one service can be associated with each of these call forwarding destinations. It is thus possible, for example to use the client C as the call forwarding destination, for speech communication links, while a client D (not illustrated here) can be used as the call destination for fax messages. This is dependent on the call signaling message RS1, in each case also including details about the service which is intended to be used by the intended communication link K1. In the client B one of those clients which is suitable for the service of the communication link K1, is then selected as the destination client.

The implementation of the feature "follow-me" in a directly-communicating communication network will be explained in the following text with reference to the FIGS. 2a and 2b. In the case of follow-me, a call is signaled not only to a called terminal (client) but at the same time also to at least one further client. In this case, the call can be received at any of the clients to which this call is signaled.

Figure 2A:
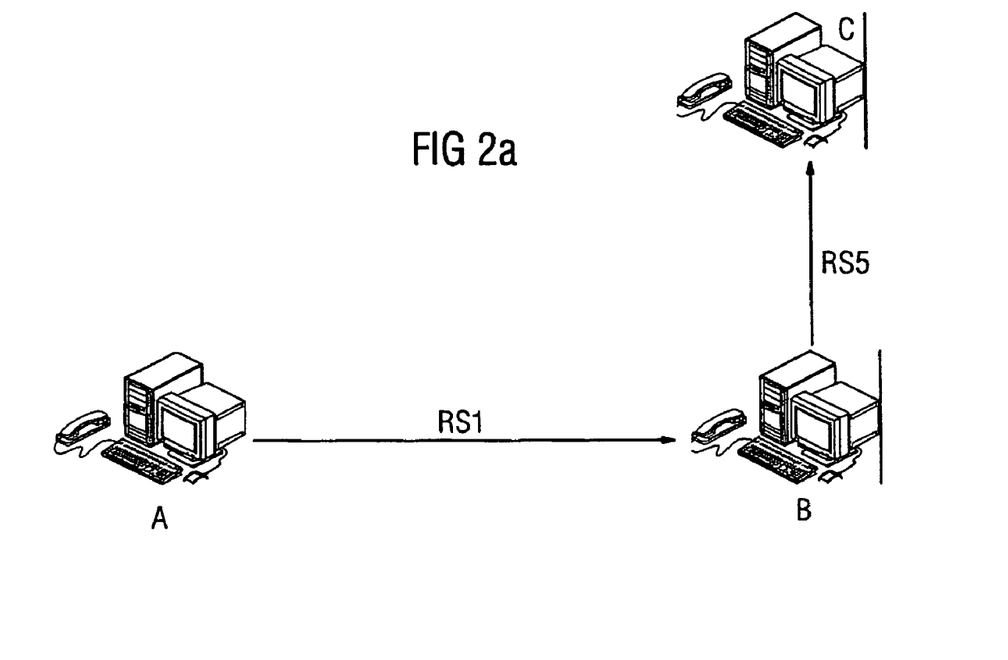
FIG. 2a shows an arrangement of clients in a directly-communicating communication network for provision of follow-me in a first variant.
Figure 2B:
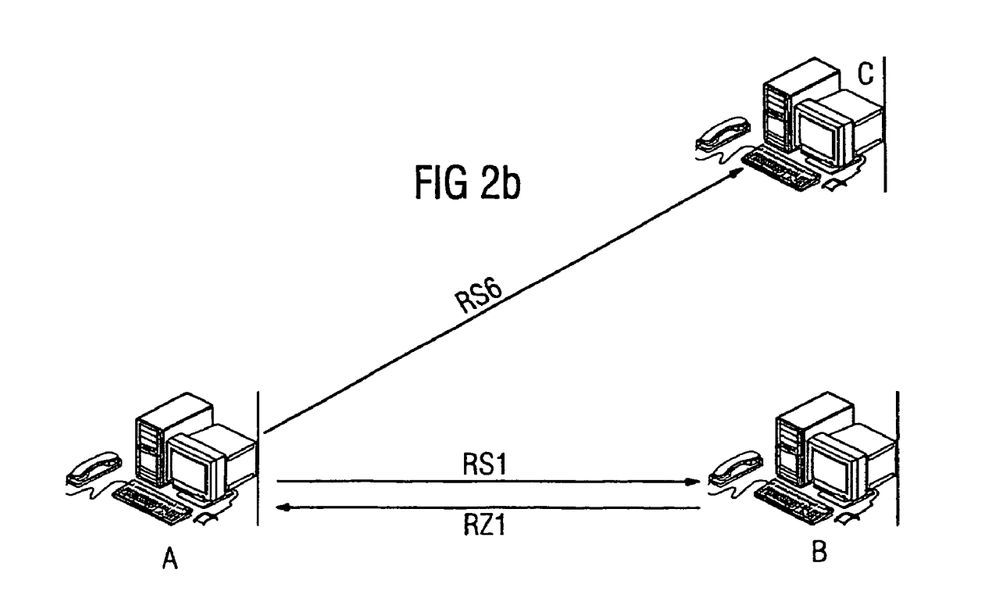
FIG. 2b shows the interchange of signaling information for the implementation of follow-me in a second variant.

FIGS. 2a and 2b show the clients A, B, C which are already known from FIGS. 1a to 1d. In a first variant of the embodiment of follow-me, which will be explained with reference to FIG. 2a, the designation and the client address information for the client C, as the destination client for follow-me, are stored by a user in the client B as the first client. In order to set up a communication link, the client A sends call signaling messages RS1 to the client B. The client B starts to signal the call ("the client B rings") and also sends further call signaling messages RS5 to the client C as the destination client, with the calling client A being indicated, with his client address information in the call signaling message RS5 in precisely the same way as in the call signaling message RS1. On the basis of the received call signaling message RS5, the call from the client A is now also signaled to the client C with a call acceptance message, which includes the client address information for the client C, being sent from the client C to the client B on acceptance of the call at the client C, and being passed on from the client B to the client A. After reception of this call acceptance message by the client A, the communication link is set up between the client A as the calling client and the client C.

Alternatively, after acceptance of the call at the client C, the call acceptance message can also be transmitted directly from the client C to the client A.

When the call which is signaled at the same time to the client B and the client C is accepted at the client B instead of the client C, the client B sends a call signaling cancellation message to the client C, after whose reception at the client C the call signaling to the client C is stopped, and the client B also sends a call acceptance signaling message to the client A, which includes the client address information for the client C, and after whose reception the client A sets up a communication link between the client A and the client C.

FIG. 2b shows a second variant for implementation of the feature "follow-me". In this example as well, the client A is the calling client, the client B is the first client, and the client C is the destination client. In the same way, the information is stored in the client B that the client C should likewise signal each call which is signaled to the client B. For this purpose, the client address information for the client C is also stored in the client B. In order to set up a communication link the client A sends a call signaling message RS1 to the client B. The call is signaled to the client B, and at the same time the client B sends a follow-me signaling message RZ1 back to the client A. It is evident from this follow-me signaling message RZ1 that the call which was signaled from the client A to the client B is also intended to be signaled to the client C with its associated client address.

After reception of this follow-me signaling message RZ1, the client A sends a further call signaling message to the client C with this call signaling message including the information that this call is a call which has been connected from the client B. After reception of the call signaling message RS6, the call is also signaled to the client C. The signaling of the call is acknowledged both by client B and by the client C, in each case by an acknowledgment message (not illustrated here) to the client A. If the call is now accepted at the client C, the client C sends a call acceptance message to the client A, after whose reception the client A sends to the client B a control message to end the call initiated by the call signaling message RS1, and as a result of which the communication link is furthermore set up between the client A and the client C.

Alternatively, the call which is signaled to the client B and to the client C at the same time can be answered by the client B, as a result of which the client B then sends a call acceptance message to the client A. In this case, the client A sends a control message to the client C in order to end the call initiated by the call signaling message (cancellation message) RS6, and the communication link is also set up between the client A and the client C.

In the case of the follow-me methods, described with reference to FIGS. 2a and 2b, a plurality of follow-me destinations can also be defined in each case in the first client B. In this case, a call can optionally be signaled at more than two terminals (clients) as well; alternatively or additionally different services can also be associated with these follow-me destinations, in which case one or more appropriate destination client or clients can be selected by the client B as a function of the service which is in each case requested by the call signaling message RS1. Furthermore, the "sender" of the call signaling message RS1 can also be evaluated in the client B, so that only calls from selected calling clients are signaled to the further clients. The implementation of the feature "callback" in a directly-communicating communication network will be described in the following text with reference to FIGS. 3a, 3b, 3c and 3d. In this case, FIGS. 3a and 3b relate to callback for a busy subscriber, while FIGS. 3c and 3d relate to callback for a free subscriber who has not accepted a call within a previously selected maximum waiting time.

Figure 3A:
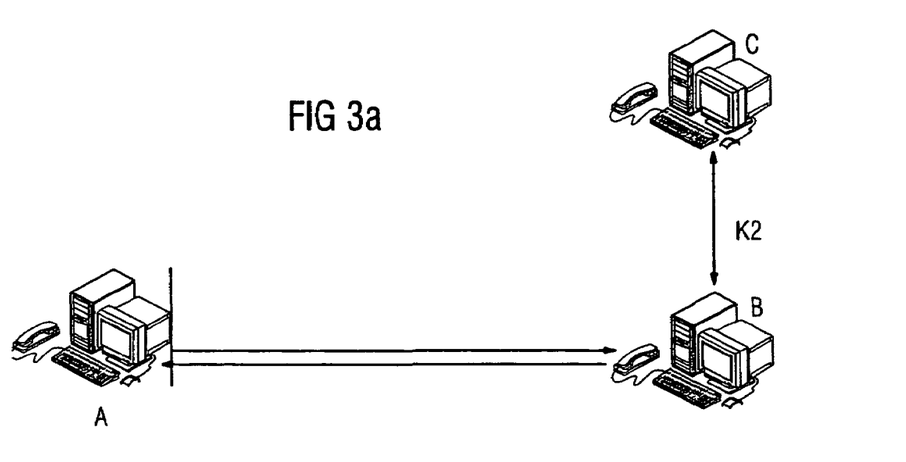
FIG. 3a shows the initiation of a callback for a busy client.

In order to explain the process for "callback when busy", FIG. 3a shows the client A as the destination client and the client B as the first client and at the same time as the calling client. The client B in this case has a communication link K2 with the client C, so that the client B is busy.

Figure 3B:
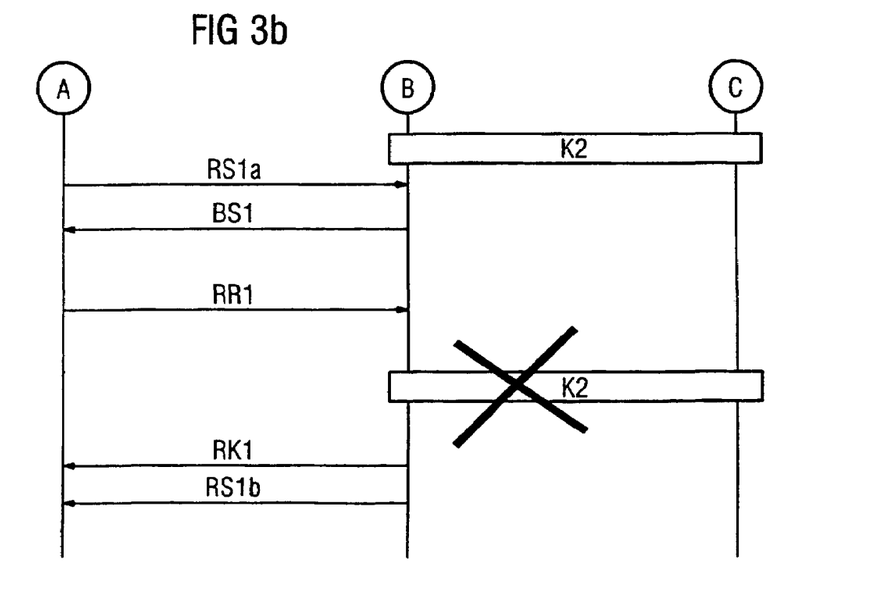
FIG. 3b shows the interchange of signaling information for initiation and for carrying out a callback for a busy client.

The preparation for and implementation of a callback between the client A and the client B from FIG. 3a will be described in the following text with reference to FIG. 3b. In order to set up a communication link, the client A sends a call signaling message RS1a to the client B. Since the client B is busy because of the communication link K2 to the client C, the client B responds to the call signaling message RS1a by sending a busy message BS1 to the client A. An indication is now provided at the client A that the desired (called) client B is busy. The user of the client A now enters a command on his terminal with the aim of initializing the callback process. This command results in the client A sending to the client B a callback request message RR1, which includes the name and client address information of the client A. The client B sends an acknowledgment message (not illustrated here) to the client A in order to acknowledge reception of the callback request message RR1.

When the communication link K2 has ended, the client B sends a callback completion message RK1 to the client A, thus signaling to the client A that the callback which was prepared for with the callback request message RR1 can take place. The client address information for the client A which was transmitted with the callback request message RR1 to the client B and restored there is used in this case to send the callback completion message RR1. After reception of the callback completion message RK1, the client A sends to the client B a new call signaling message RS1b as a result of which the call from the client A is signaled to the client B, which is now no longer busy. Once the call has been accepted at the client B (this step is no longer illustrated in FIG. 3b), the client B sends a call acceptance message to the client A, as a result of which the communication link is set up between the client A and the client B.

Figure 3C:
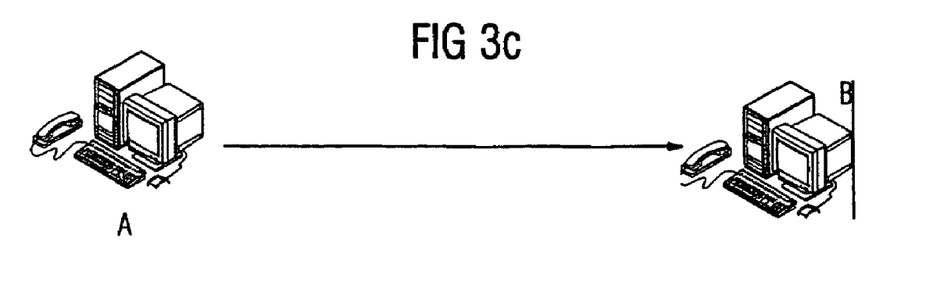
FIG. 3c shows the signaling of a call for a free (not busy) client.
Figure 3D:
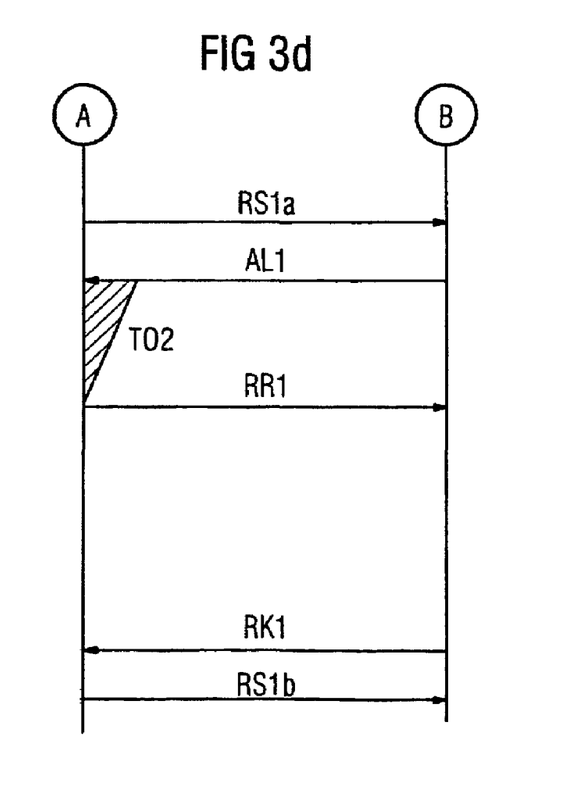
FIG. 3d shows the signaling information for the initiation and for carrying out a callback for a free client.

FIGS. 3c and 3d illustrate the process of callback to a free subscriber with FIG. 3c showing the arrangement in which the client A is the destination client and the client B is the first client, and is at the same time a calling client. The interchange of the signaling messages relating to this between the client A and the client B is illustrated schematically in FIG. 3d.

As can be seen from FIG. 3d, the client A sends a first call signaling message RS1a to the client B in order to set up a communication link. As a result of this call signaling message RS1a, the call is signaled to the client B and the client B sends a call acknowledgment message AL1 ("alerting") to the client A as an acknowledgment message. A maximum time TO2 (in this case 20 seconds) is stored in the client A, and defines the maximum time period for call signaling of a call originating from the client A. If the call has not been accepted by the client B within this maximum time TO2, the client A sends to the client B the callback request message RR1 which, in addition to the request for callback, also includes the client address information for the client A. This callback request is stored in the client B together with the received client address information of the client A.

The process of carrying out the callback from the client B to the client A makes sense, of course, only when a user is present at the client B for whom the communication link could be intended. The terminal which forms the client B thus waits for a corresponding event which could indicate the presence of a natural person. In this case, this is the pressing of any key on the user interface of the client B. Any other event which can be detected by a technical device that is connected to the client B may, of course, also be used for this purpose. Once this event has been entered, a callback completion message RK1 is sent from the client B to the client A, as a consequence of which the client A sends to the client B a new call signaling message RS1b. After reception of the call signaling message RS1b, the call is signaled to the client B, in which case, after the call has been accepted, an appropriate call acceptance message (not illustrated any further here) is sent from the client B to the client A and this also results in the communication link being established between the client A and the client B. In this case, it should be noted that the call signaling and thus the setting up of the call originate from the client A both in the case of the call signaling message RS1a and in the case of the further call signaling message RS1b, so that the client A is debited with the payment of the charges, even in the case of the callback, charges which should generally always be debited to the originally calling client.

In the case of the abovementioned exemplary embodiments it may be advantageous if a call to a client need not be explicitly accepted by a user. For this purpose, the call signaling messages are used to signal to a called client a "message" command, which results in the call signaling being suppressed and the called client being switched directly either to a "replay" mode (receive/replay) or to a completely active mode ("direct addressing" mode, transmission and reception). The "message" command can alternatively also be used to specify that a message which will be transmitted subsequently will not be replayed immediately, but after a defined time delay, at a specific time, or as a function of a specific event (pressing of a key, fire alarm, ending of an existing communication link, etc.).

Figure 4A:
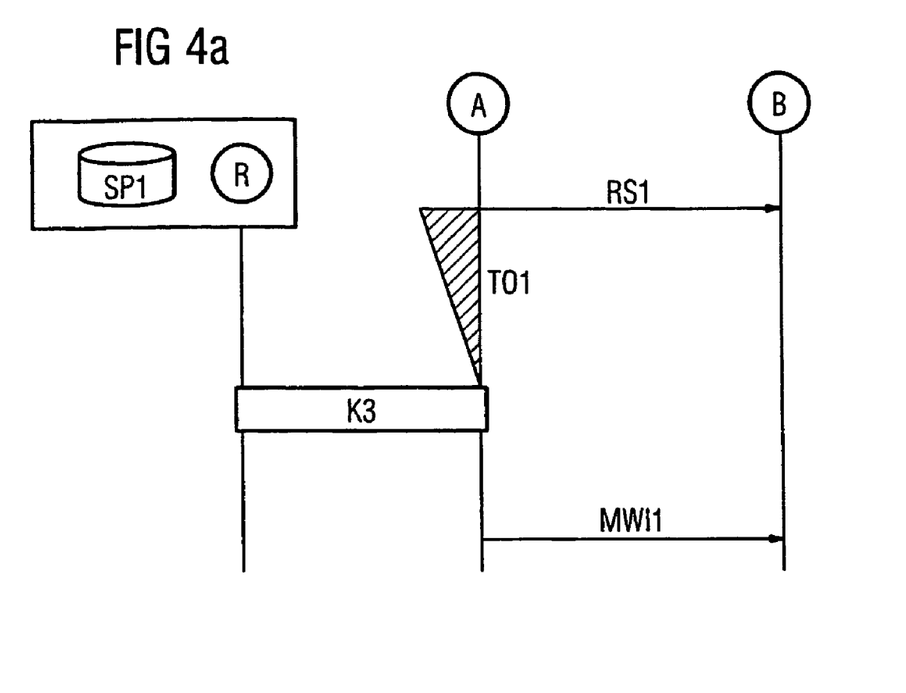
FIG. 4a shows the storage of a message for a client and the signaling of a stored message for this client.
Figure 4B:
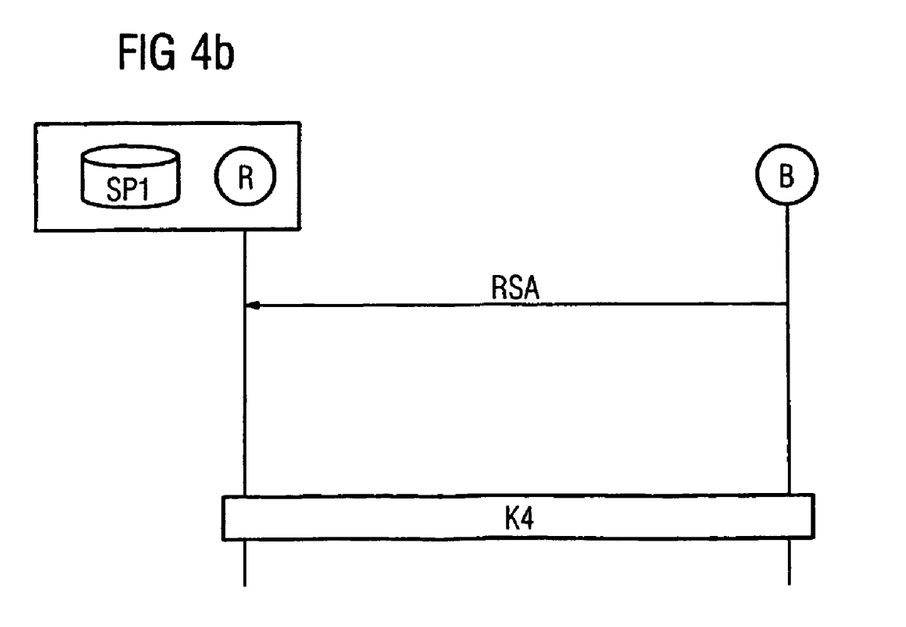
FIG. 4b shows the calling up of the stored message by the notified client.

FIGS. 4a and 4b show the signaling of a recorded message for a relevant client, and the calling of this stored message by the relevant client is described. The visualization (signaling) of a waiting message on the user interface of a client is also referred to as the "message waiting indication".

First of all, the recording and the signaling of a message will be described with reference to FIG. 4a. In order to set up a communication link, a client A sends a call signaling message RS1 to the client B, where the call is now signaled. However, the call is not answered at the client B, so that, once a previously defined waiting time TO1 (in this case 20 seconds) has elapsed, a control message (not illustrated here) is sent from the client A to the client B in order to end the call signaling (call cancellation message), this ending the call signaling to the client B. The user of the client A is now offered the option on the user interface to set up a link to a message store ("call answering service"), in order to store a message for the client B that cannot be reached. After confirmation by the user, the client A sets up a communication link to the client R, which is equipped with an appropriate memory unit SP1.

In the present case, the client address information for the client R is permanently programmed in the client A; the client A may, of course, also have search functions by which one or more clients which have appropriate memory devices can be found in a directly communicating communication network. In this case, as in the previous examples, a distinction can possibly be drawn between different services, so that only speech memories ("voice mail server") are looked for and used for speech links, and e-mail servers or the like are looked for and used for example for text messages. The client A uses the communication link K3 set up to the client R to store the message to be stored in the data memory SP1 of the client R and then sets up the link to the client R. After this, the client A sends to the client B, which is being used as the first client, a message waiting indication MWI1, which includes the client address information of the client R being used as the destination client, and an identification number for the message to be called up.

The process of the client B, which in this case is being used as the called client, calling up the previously stored message will be explained in the following text with reference to FIG. 4b. The user of the client B sees the information on the optical display of the user interface of the client B that a stored message from the client A can be called up. Once the user has entered a call-up command, the client B sends a specific call signaling message RSA to the client A in order to call up messages, with this call signaling message RSA including the identification number of the stored message intended for the client B. Furthermore, the call signaling message RSA includes the client address information for the client B. The communication link K4, via which the client R transmits the message stored in the data memory ST1 to the client B, is set up between the client B and the client R on the basis of the client address information interchanged in this way.

Figure 5:
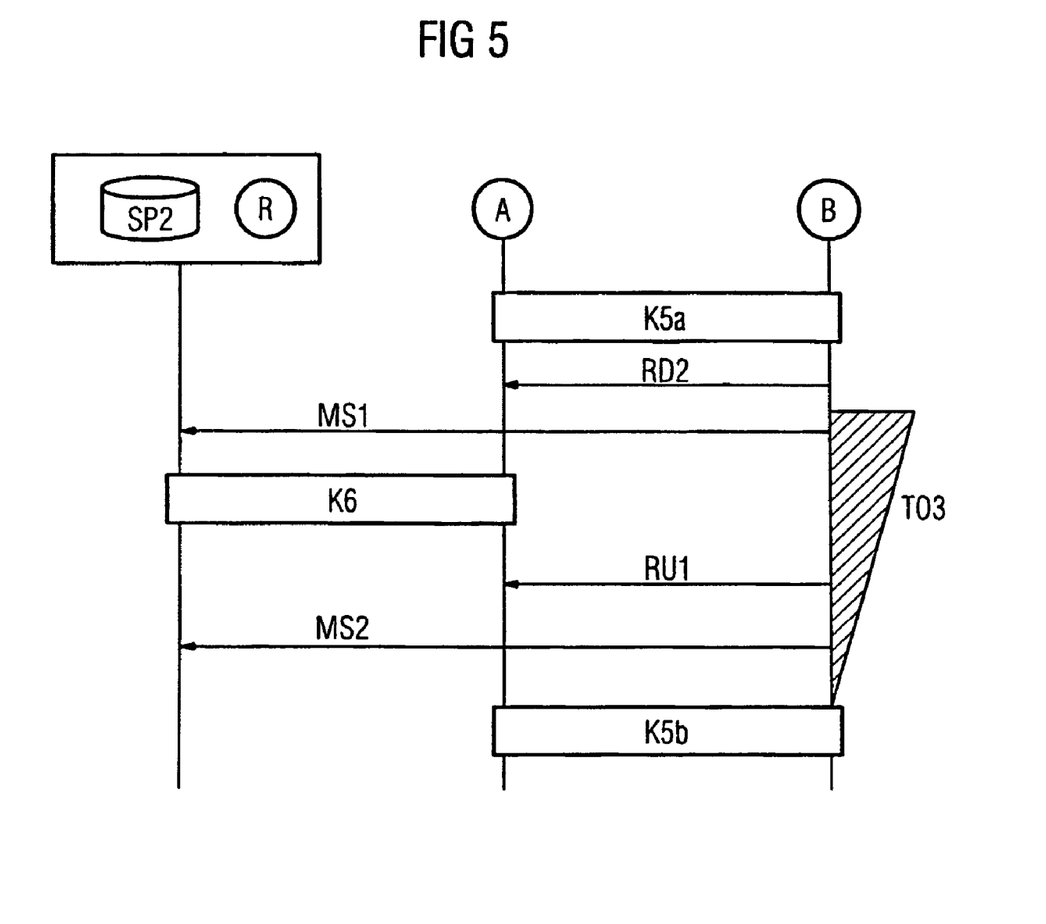
FIG. 5 shows the supply of a client with waiting information while a communication link is on hold.

The setting up and the clearing of a communication link from a waiting client to an information source for waiting information will be described in the following text with reference to FIG. 5. In this case the waiting client can not only be supplied with waiting music or audio-based waiting information but it is also possible to provide, for example video messages or text-based information to the waiting user depending on the configuration of the client and the waiting information source. This feature is thus in general also referred to as "media on hold".

In the initial state, the client A as the first client and the client B as the second client are connected to one another in a communication link K5a. This communication link K5a is assumed to have been temporarily interrupted by the client B. One possible reason for this is an inquiry from the client B and a further possible reason may be the intention of the client B to supply the client A with previously stored information. The last-mentioned application is typical of a call center, in which a caller is asking for specific information and this information is played back to the caller, initiated by a call center agent.

In order to interrupt the communication link K5a and to start the information playback, the client B sends to the client A a call redirect signaling message RD2 (RD=redirect), which in addition to the "redirect" command includes the client address information for the client R that is intended to be the destination client. This client address information is stored in the client A, which is being used as the first client. Furthermore, the client B sends a message select signaling message MS1 (MS=message select) to the client R, in which the designation of that information which is intended to be made available to the client A is transmitted to the client R. The signaling message MS1 for this purpose also, of course, includes the client address information for the client A. The client R is equipped with the database SP2, in which a number of selectable information contents are stored in the form of files.

As the calling client, the client A now sends signaling messages (not illustrated here) in order to set up a communication link K6 to the client R. This signaling message contains the client address information for the client A. In the client R, it is found that a message has already been selected for this client A, so that the client R sends a acknowledgement message "connect" (likewise, not illustrated here) to the client A, after whose reception the communication link K6 is set up. The communication link K6 is a monodirectional communication link, that is to say only a single data stream (data channel) is switched, specifically from the client R to the client A.

Alternatively, the information relating to the selected message can also be transmitted from the client B to the client A. Once the communication link K6 has been set up, the client A then itself requests the message from the client R.

In the present exemplary embodiment, this is waiting information which is transmitted by the communication link K6 from the client R to the client A, where it is reproduced. This waiting information is used to bridge the time period for an inquiry (not illustrated here) from the client B. Once this inquiry has been completed, the client B should end the replaying of the waiting music to the client A, and the interrupted communication link K5a should be resumed. For this purpose, the client B sends a signaling message RU1 (connection transfer message) to the client A, which includes the client's address information for the client B and reference to the call redirect signaling message RD2. The client A therefore recognizes that the client B has the authorization to end the existing communication link K6 and to request the setting up of a "new" communication link K5b, which is used as a continuation of the interrupted communication link K5a. Together with the signalling message RU1, the client B sends to the client R a media control message MS2, in order to stop the replaying of the waiting information.

After reception of the signaling message RU1 the communication link K6 is ended by the client A, and the communication link K5b is set up between the client A and the client B. Alternatively, it is also possible to avoid sending the media control message MS2 from the client B to the client R in order to allow the communication link K5b to be interrupted once again by the client B at a later time, in order then to continue the replaying of the waiting information for the client A at the previously interrupted point.

If the replaying of the waiting information is not carried out purely to bridge the waiting time but to provide specific information of the client A, it is advantageous to replay all of the selected waiting information to the client A. In this case, the link is not retrieved by the client B with the aid of the signaling message RU1 at an arbitrary time, and instead of this the client R then uses a signaling message "message complete" (not illustrated) to signal to the client B that the requested information has been replayed completely, in which case the client B does not initiate the clearing of the communication link K6 and the setting up of the communication link K5b to the client A until the "message complete" signaling message has been received.

Temporary interruptions in the waiting information replay ("announcement") and thus in the communication link K6 are also possible, for example for a personal inquiry. This inquiry can be initiated either by sending appropriate signaling messages from the client B to the clients A and R, or by signaling messages which are sent from the client A to the clients B and R. Instead of completely interrupting the communication link K6, it is alternatively possible in the first-mentioned case to also "merge" the inquiry "softly" into the waiting information replay. For this purpose, specific control commands are transmitted with signaling messages transmitted by the client B leading to appropriate mixing of the waiting information with the inquiry in the client A.

The invention claimed is:

1. A method for setting up a communication link between two clients of a plurality of clients in a directly-communicating communication network in which the communication link is set up directly between the two clients, comprising:
   storing the client address information for at least one destination client in a first client;
   a calling client sending signaling information to the first client to initiate call signaling;
   the first client transmitting address information for a destination client to the calling client, the first client configured to transmit the client address information for the destination client to the calling client if the first client does not accept the signaling information from the calling client within a waiting time period;
   setting up the communication link between the calling client and the destination client by the calling client using the client address information of the destination client that the first client transmitted to the calling client.

2. The method as claimed in claim 1, wherein a user of the first client determines that a call will be forwarded to the destination client on the basis of received signaling information.

3. The method as claimed in claim 2, wherein details about the waiting time period are stored in the first client.

4. The method as claimed in claim 1, wherein in order to forward a call, the destination client forms the call forward destination for the first client, and wherein when a call arrives from the calling client, the first client sends signaling information for call signaling of a further call to the destination client, and wherein upon acceptance of the further call at the destination client, the destination client transmits a call acceptance signaling message to the first client, the first client transmitting the client address information for the destination client to the calling client after receiving the call acceptance signaling message from the destination client.

5. The method as claimed in claim 4, wherein the signaling information for call signaling of the further call is transmitted to the destination client if the call is not answered at the first client within the waiting time period.

6. The method as claimed in claim 1, wherein the destination client is provided as a follow-me destination, and wherein the calling client sends signaling information for call signaling to the first client for a request to set up the communication link, and the first client sends further call signaling information to the destination client such that call signaling takes place both at the first client and at the destination client, the further call signaling information identifying the calling client.

7. The method as claimed in claim 1, wherein the destination client is provided as a follow-me destination, and wherein the calling client attempts to establish a call by sending the signaling information to the first client for a request to set up the communication link, and wherein the first client sends further signaling information for call signaling to the destination client such that call signaling takes place both at the first client and at the destination client, and wherein the destination client sends a call acceptance message to the first client after acceptance of the call, and wherein the first client also transmits the call acceptance message with the client address information of the destination client to the calling client, the communication link being set up between the calling client and the destination client after the calling client receives the call acceptance message.

8. The method as claimed in claim 1, wherein in order to prepare for a callback when an incoming call from the destination client to the first client is not accepted, and wherein the destination client stores the client address information together with the callback information in the first client, and wherein the first client requests the destination client to carry out the callback.

9. The method as claimed in claim 8, wherein the preparation for a callback is carried out when the first client is in the busy state and the callback is made when the busy state of the first client no longer exists.

10. The method as claimed in claim 8, wherein the preparation for a callback is carried out when the incoming call has not been accepted at the first client within the waiting time period and the callback is initiated when an event which reflects the presence of a user is detected at the first client.

11. The method as claimed in claim 1, wherein in order to record and to call a message which is intended for the first client, a calling client sets up the communication link to the destination client to store a message in the destination client, and wherein the presence of the stored message is signaled to the first client.

12. The method as claimed in claim 11, wherein a plurality of recording clients for storage of messages are available in the communication network and the destination client is selected to be a suitable recording client.

13. The method as claimed in claim 1, wherein the destination client is configured to transmit waiting information to the calling client via the communication link and the first client is configured to clear the communication link and establish a communication link between the first client and the calling client, the first client configured to send a message to the destination client to stop the sending of the waiting information.

14. The method as claimed in claim 1, wherein the calling client transmits call signaling information with a control command to the destination client when setting up the communication link so that a call is accepted automatically by the destination client.

15. The method of claim 1 further comprising:
the first client sending a follow-me signaling message to the calling client;
the calling client sending a further call signaling message to the destination client;
the destination client sending a call acceptance message to the calling client; and
the calling client sending a control message to end the call signaling initiated by the sending of the signaling information from the calling client to the first client.

16. A method for setting up a communication link between two clients of a plurality of clients in a directly-communicating communication network in which the communication link is set up directly between the two clients, comprising:
storing the client address information for a plurality of destination clients in a first client;
the calling client sending call signaling information to the first client for a request to set up the communication link;
the first client determining that a call signaled via the call signaling information will be forwarded to the destination client on the basis of signaling information received from the calling client, the destination client being a call forward destination for the first client; and
transmitting client address information for a destination client from the first client to a calling client to forward the call; and
setting up the communication link between the calling client and the destination client by the calling client using the client address information of the destination client; and
wherein the client address information for the destination clients are associated with different services and wherein when a call arrives at the first client, the signaling information received from the calling client defines the service which is intended to be supported by the communication link to be set up, and wherein the client address information for the destination client which is associated with the service identified in the signaling information the first client received from the calling client is transmitted to the calling client.

17. The method as claimed in claim 16, wherein the services are selected from the group consisting of: speech services, video services and data services.

18. A method for setting up a communication link between two clients of a plurality of clients in a directly-communicating communication network in which the communication link is set up directly between the two clients, comprising:
storing the client address information for at least one destination client in a first client;
transmitting stored client address information for a destination client from the first client to a calling client;
setting up the communication link between the calling client and the destination client by the calling client using the client address information for the destination client;
storing a recordable message in the destination client, the recordable message being for the first client;
signaling a presence of the stored message to the first client;

the first client calling up the stored message at the destination client; and a plurality of recording clients for storage of messages being available in the communication network and the destination client being selected to be a suitable recording client; and wherein the recordable message is associated with the recording client and the recording client is selected to be the suitable recording client such that the recording client is able to record the recordable message.

19. A method for setting up a communication link between two clients of a plurality of clients in a directly-communicating communication network in which the communication link is set up directly between the two clients, comprising:

storing the client address information for at least one destination client in a first client;

transmitting stored client address information for the destination client from the first client to a calling client;

setting up the communication link between the calling client and the destination client by the calling client using the client address information of the destination client;

the destination client sending waiting information to the calling client;

the destination client sending a message complete message to the first client after transmitting the waiting information;

clearing the communication link between the calling client and the destination client; and establishing a communication link between the first client and the calling client.

20. A method for setting up a communication link between two clients of a plurality of clients in a directly-communicating communication network in which the communication link is set up directly between the two clients, comprising:

storing the client address information for a destination client in a first client;

transmitting the stored client address information for the destination client from the first client to a calling client; and setting up the communication link between the calling client and the destination client by the calling client using the client address information of the destination client;

the destination client sending waiting information to the calling client;

the destination client sending a message complete message to the first client after transmitting the waiting information;

clearing the communication link between the calling client and the destination client; and establishing a communication link between the first client and the calling client; and wherein the destination client is selected from a plurality of usable clients in the communication network, one of the usable clients being selected as the destination client by the first client.

* * * * *